United States Patent [19]

Berg

[11] Patent Number: 4,466,631

[45] Date of Patent: Aug. 21, 1984

[54] BALL JOINT ASSEMBLY FOR DRAFT ARM

[75] Inventor: David A. Berg, Milwaukee, Wis.

[73] Assignee: Allis-Chalmers Corporation, Milwaukee, Wis.

[21] Appl. No.: 424,006

[22] Filed: Sep. 27, 1982

[51] Int. Cl.³ .............................................. F16C 11/06
[52] U.S. Cl. .................................. 280/415 A; 403/122
[58] Field of Search ...................... 280/415 A, 415 R; 403/122, 138, 136, 134, 145

[56] References Cited

U.S. PATENT DOCUMENTS 3,151,882 10/1964 Foxwell et al. ................. 280/415 A
3,394,948 7/1968 Rugen et al. ................... 403/122 X
3,876,232 4/1975 Pertusi ............................ 280/415 A
3,941,495 3/1976 Duncan ........................... 403/122 X

FOREIGN PATENT DOCUMENTS 2506868 12/1982 France ................................ 403/122
655735 8/1951 United Kingdom ........... 280/415 A Primary Examiner—John A. Pekar
Attorney, Agent, or Firm—Arthur L. Nelson

[57] ABSTRACT

A ball joint assembly for a draft link of a three-point hitch on the tractor. The ball can be assembled through a slot in a side of the link and rotated in a spherical socket where it is retained by a retaining element.

10 Claims, 8 Drawing Figures

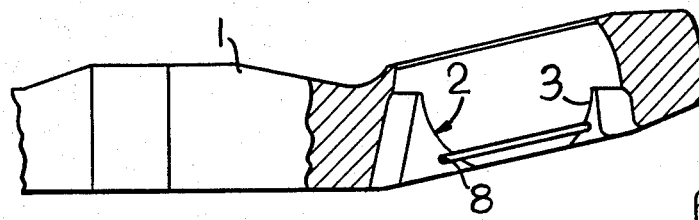
FIG. 1
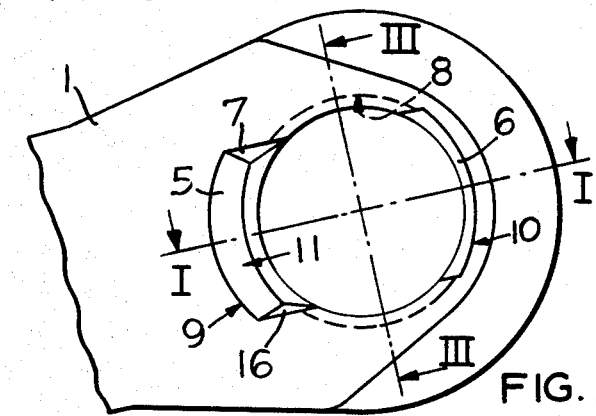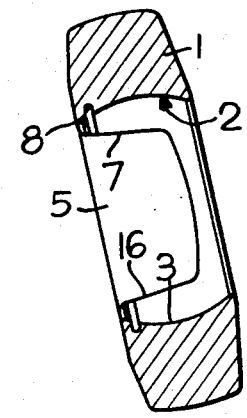
FIG. 2  FIG. 3
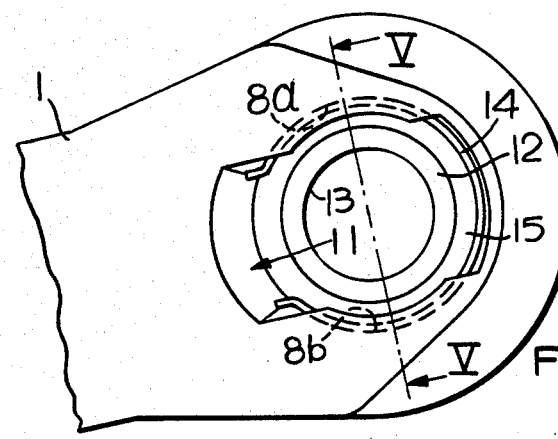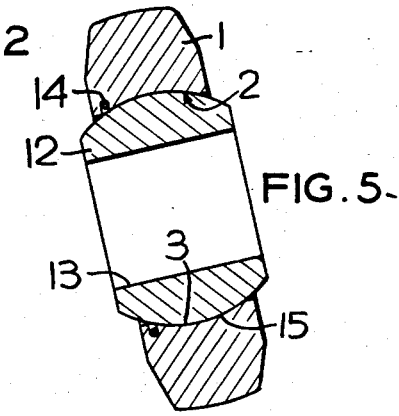
FIG. 4  FIG. 5
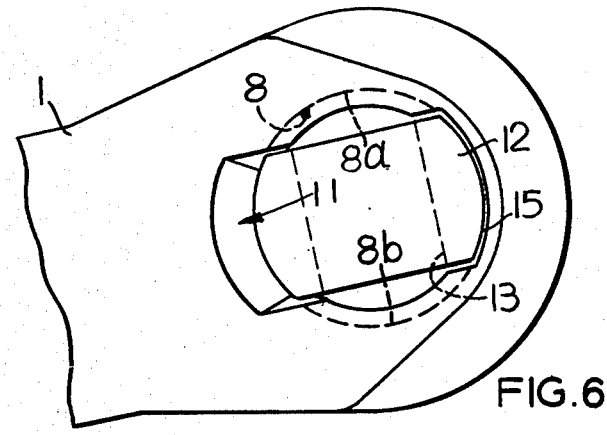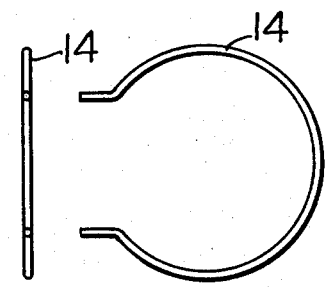
FIG. 6  FIG. 7  FIG. 8

BALL JOINT ASSEMBLY FOR DRAFT ARM

This invention relates to a hitch having draft links and more particularly to a spherical element received in a socket in a draft link through a slot in the link and rotated 90° where it is held by a retainer means.

Three point hitches are used extensively on farm tractors as a means for coupling the tractor to the implement. The top link and lower draft links require universal movement between the links and the tractor as well as the implement. Accordingly, a spherical bushing mounted in a spherical socket having a cylindrical opening to receive a pin is generally used to provide the connection.

Assembling of a spherical bushing in the draft link is often done through a swagging operation in which the bushing is permanently fixed in the draft arm. There may be some advantage in removing the bushing since it will permit use of bushings of different sizes to accommodate different categories of hitches and also provide a means for replacement of the bushing in case of wear. Accordingly, the applicant has provided for a removable bushing which can be inserted through a slot transversely of the link. Once the spherical bushing is received within the socket, it is rotated 90° to its operating position. A retainer then is placed in the draft link to retain the bushing in its operating position.

The Pertusi patent, U.S. Pat. No. 3,876,232, shows a removable bushing which can be inserted in a draft link and retained in its operating position or removed from the link for replacement or servicing. The manner of assembling the spherical bushing, however, requires a cylindrical face on opposing sides of the bushing to accommodate its positioning in the spherical socket. The bushing is then rotated 90° and locked in position by a retainer. The applicant's invention, however, uses a spherical bushing without the cylindrical faces on the peripheral surface of the bushing. The link is provided with a transverse slot to accommodate inserting of the bushing into the socket. Once it is received within the socket, it is rotated 90° and locked in the bushing by a retainer. Use of a spherical bushing provides for easier machining the external surface on the bushing since only a single surface is required. It does not require machining a spherical surface and cylindrical surface on the same bushing.

It is an object of this invention to provide a spherical bushing having retaining means in a draft link of a vehicle.

It is another object of this invention to have a removable spherical bushing having a retainer means received in a spherical socket. The bushing is then rotated and locked in the operating position by the retainer means.

It is a further object of this invention to provide a three-point hitch having a universal bearing for connecting it to an implement. The link includes a spherical socket connected to an entry slot to receive the bushing. When the bushing is received in the spherical socket, it is rotated and then locked in the operating position by a retainer to provide a means of fastening the link to the implement. A pin is received in a cylindrical opening in the spherical bushing to form the connection between the link and implement.

The objects of this invention are accomplished in a link of the three-point hitch which forms a spherical socket and an entry slot to provide entry of the bushing into the socket. The bushing is slid through the slot into the socket and then rotated 90° to its operating position. The bushing is locked in its operating position by a retainer element. A cylindrical opening in the spherical bushing receives a pin for connecting the link to the implement.

Referring to the drawings the preferred embodiment of this invention is illustrated:

FIG. 1 illustrates a cross section view of a portion of a draft link taken on line I—I of FIG. 2;

FIG. 2 illustrates a side elevation view of the end of the link showing the slot and the spherical socket in the draft link;

FIG. 3 illustrates a cross section view taken on line III—III of FIG. 2;

FIG. 4 illustrates a side elevation view of the assembly of the spherical bushing, and the retainer in the draft link;

FIG. 5 illustrates a cross section view taken on line V—V of FIG. 4;

FIG. 6 illustrates a view of the spherical bushing received in the slot before rotation to its operating position;

FIG. 7 is an end view of the retainer; and

FIG. 8 is a side elevation view of the retainer.

Referring to the drawings, the draft link 1 is formed with a spherical socket 2 in the end of the link.

The spherical socket 2 is formed by a spherical surface 3. Spherical surface 3 adjoins the slot 11 formed by the end surfaces 5 and 6 and the side surfaces 16 and 7.

A retainer element 14 is received in the annular groove 8 on the side of the spherical socket 2. Although the spherical surface 3 is interrupted by the ends 9 and 10 of the slot 4, there is sufficient bearing surface for the retainer to lock the spherical bushing in its operating position.

FIG. 6 illustrates the spherical bushing 12 being inserted in the slot 11. The spherical bushing in this position is inserted into the slot until it seats in the spherical socket 2 of the link 1. The spherical bushing 12 forms a cylindrical opening 13 adapted for receiving a pin for connecting the link to an implement. The retainer element 14 is shown in FIGS. 7 and 8.

The spherical bushing is formed with a spherical surface 15 about its outer periphery which engage the mating surface 3 of the link 1. Slot 11, however, forms an interruption of the spherical surface in order to allow the bushing to enter the spherical socket 2.

In the operating position, the retainer 14 prevents the spherical bushing from coming out of the socket 2 although the spherical bushing can rotate within the socket.

The assembly of the device will be described in the following paragraph.

Three components of the assembly are the link 1, the spherical bushing 12 and retainer 14. The spherical bushing 12 is inserted in the slot 11 as shown in FIG. 6. The spherical bushing slides through the slot 11 until it engages the spherical socket 2 in link 1. In this position the retainer 14 can be positioned in one side of the annular groove 8 as the bushing 12 is rotated slightly. The bushing 12 is then counterrotated to allow the retainer 14 to enter the annular recess 8 on the opposite side of the bushing. Once it seats on both sides of the annular recess 8a and 8b, the retainer locks in place due to the resilient force causing it to expand in the recess 8. This locks the bushing 12 in the sperical socket 2 in the assembled position. To remove the spherical bushing 14 from the socket 2, the procedure is reversed and the spherical bushing can be removed to be replaced or serviced.

The embodiments of the invention in which an exclusive property or privilege is claimed are defined as follows:

1. A draft link having a bearing assembly comprising, a link defining a spherical socket having a spherical inner surface, a spherical bushing positioned in said spherical socket forming an interface between the outer periphery at said bushing and the spherical inner surface of said socket, means defining an entry slot extending lengthwise in the link for receiving the spherical bushing and assembly in said spherical socket, means defining an inner peripheral groove recessed in the spherical surface of the spherical socket on the entry side of said spherical socket, a retainer received in said groove and extending into said entry slot for retaining said spherical bushing in said spherical socket and said bushing locking said retainer when said bushing and retainer are in their operating positions.

2. A draft link having a bearing assembly as set forth in claim 1 wherein said spherical bushing defines a cylindrical central opening adapted for receiving a pin.

3. A draft link having a bearing assembly as set forth in claim 1 wherein said retainer defines a spring retained in said groove by the expansive force of said spring.

4. A draft link having a bearing assembly as set forth in claim 1 wherein said spherical bushing defines a spherical surface about the total outer periphery of said spherical bushing, said means defining said entry slot defining a longitudinal entry slot for receiving said spherical bushing in assembling said bushing and said link.

5. A draft link having a bearing assembly as set forth in claim 1 wherein said spherical bushing defines a spherical surface around the total periphery of said bushing.

6. A draft link having a bearing assembly as set forth in claim 1 wherein said peripheral groove for reception of said retainer defines a groove adjacent the edge of said socket on the side of said entry slot.

7. A draft link having a bearing assembly as set forth in claim 1 wherein said means defining said slot defines a slot extending into the peripheral socket on both sides of the axial center of said socket.

8. A draft link having a bearing assembly as set forth in claim 1 wherein said means defining said entry slot defines an opening extending beyond said spherical socket, said retainer defines a spring having handles received in said opening in said slot beyond said spherical socket for convenience in assemblying or disassemblying.

9. A draft link having a bearing assembly as set forth in claim 1 wherein said retainer defines an arcuate configuration in its disassembled position.

10. A draft link having a bearing assembly as set forth in claim 1 wherein said spherical socket defines a seat in the bottom of said slot whereby said spherical bushing can rotate from its entry position to its operative position in said spherical socket.

* * * * *